Nov. 23, 1965 G. P. HOUCKE 3,219,998

BINARY CODE TRANSLATOR

Filed Aug. 3, 1962 2 Sheets-Sheet 1

INVENTOR
G. P. HOUCKE
BY R C Lipton
ATTORNEY

BINARY CODE TRANSLATOR

Filed Aug. 3, 1962 2 Sheets-Sheet 2

INVENTOR
G. P. HOUCKE
BY
R C Lipton
ATTORNEY

United States Patent Office 3,219,998
Patented Nov. 23, 1965

3,219,998
BINARY CODE TRANSLATOR

George P. Houcke, Tenafly, N.J., assignor to Bell Telephone Laboratories, Incorporated, New York, N.Y., a corporation of New York Filed Aug. 3, 1962, Ser. No. 214,718
14 Claims. (Cl. 340—347)

Figures 1, 4:
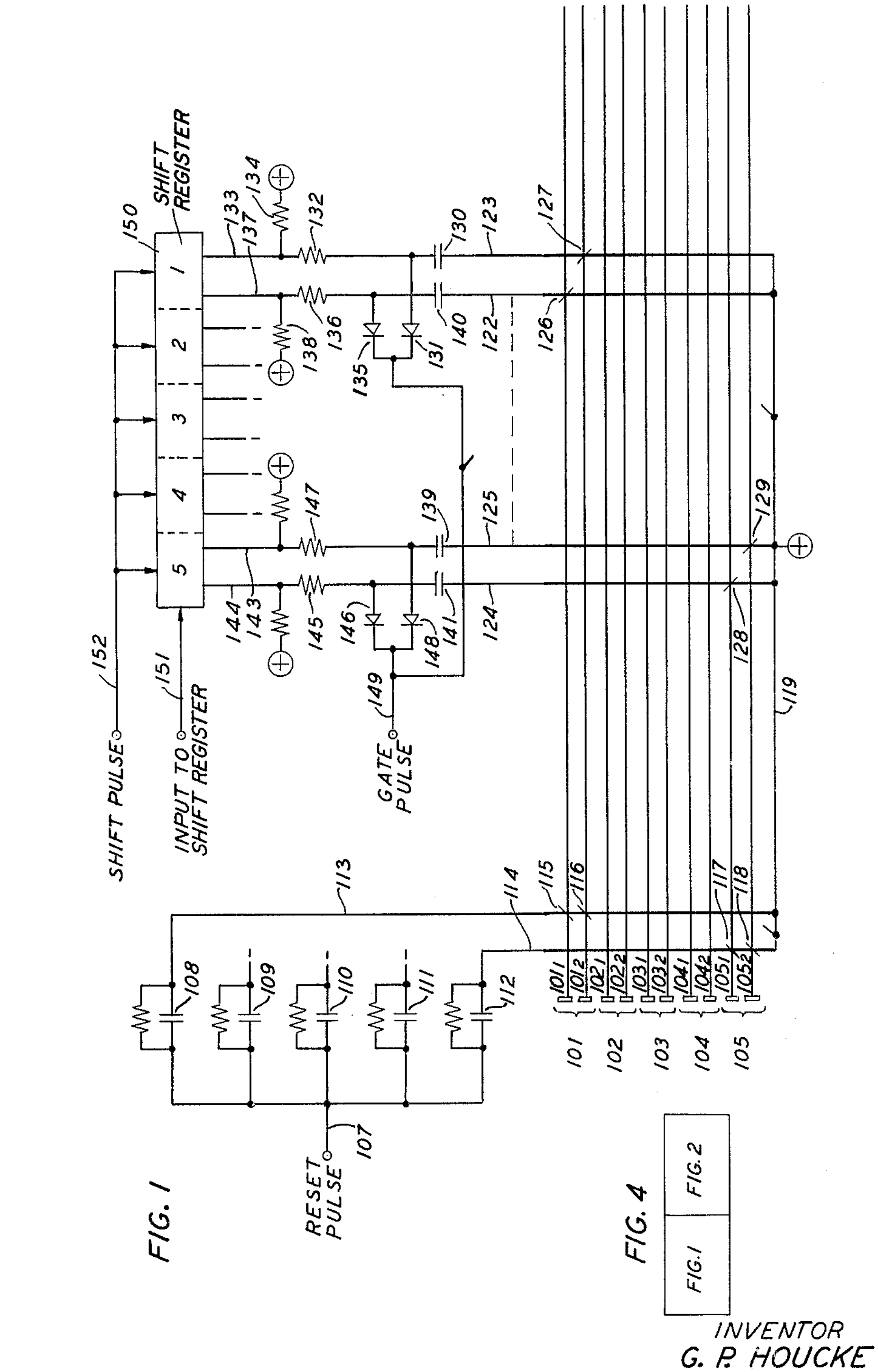

This invention relates to a translator for binary permutation signal element codes which may be utilized in data transmissions systems and more particularly to decoders for binary code characters utilizing magnetic cores.

It is a broad object of this invention to provide a new and improved translator circuit for binary code characters wherein the decoding function is performed by magnetic elements.

In a data transmission system it is sometimes necessary to interconnect data sets which communicate with different codes. To render the data sets compatible, a translator is included in the interconnection circuit to provide a conversion from one code to the other. For the high speed data systems in present use the translator requirements include rapid switching and low power characteristics. It has been found that magnetic cores utilized, for example, as decoding elements satisfy these requirements. In a typical arrangement the elements of the binary code character to be decoded are applied in parallel to magnetic cores associated therewith. The consequent switching of the associated cores provides net resultant signals on output leads which are individually inductively connected to predetermined cores in accordance with the coding of each binary code character. The detection of the resultant signal which exceeds a predetermined threshold then selects the desired output lead. Detection becomes increasingly difficult, however, as the number of code characters to be decoded increase or circuit conditions, due to temperature or voltage supply, for example, vary.

Accordingly, it is an object of this invention to preclude the application of the resultant signal to all but one output lead.

Another object of this invention is to reduce the net signal applied to unselected output leads.

A further object of this invention is to utilize the associated cores for cancelling the incremental net signal.

In accordance with a specific embodiment of the invention a plurality of pairs of magnetic cores equal in number to the elements in the binary code character are connected in parallel to input leads in a manner wherein a selected one core in each pair is switched in accordance with the state of the binary element. Output leads interleave the cores in each pair in such a way that an enabling signal is applied to the output lead when one core is switched and an opposing signal is applied to the output lead when the other core is switched. Thus the output lead connected to the cores in accordance with the received binary code character has impressed thereon a net enabling signal provided by the switching of a core in each of the pairs while each of the other output leads has impressed thereon a net resulting signal comprising enabling signals together with opposing signals as determined by the manner that the lead interleaves the core pairs. Since the additive enabling signal will exceed the additive opposing signal impressed on certain of the unselected leads, all of the leads are connected in series with a common reference lead which interleaves the cores in all but one of the pairs in such a way that a reference signal is applied to the reference lead when either core in the pair is switched. The reference signal is then applied to the output leads in opposition to the enabling signals whereby the incremental additive enabling signal on each of the unselected leads is cancelled.

Figures 2, 3:
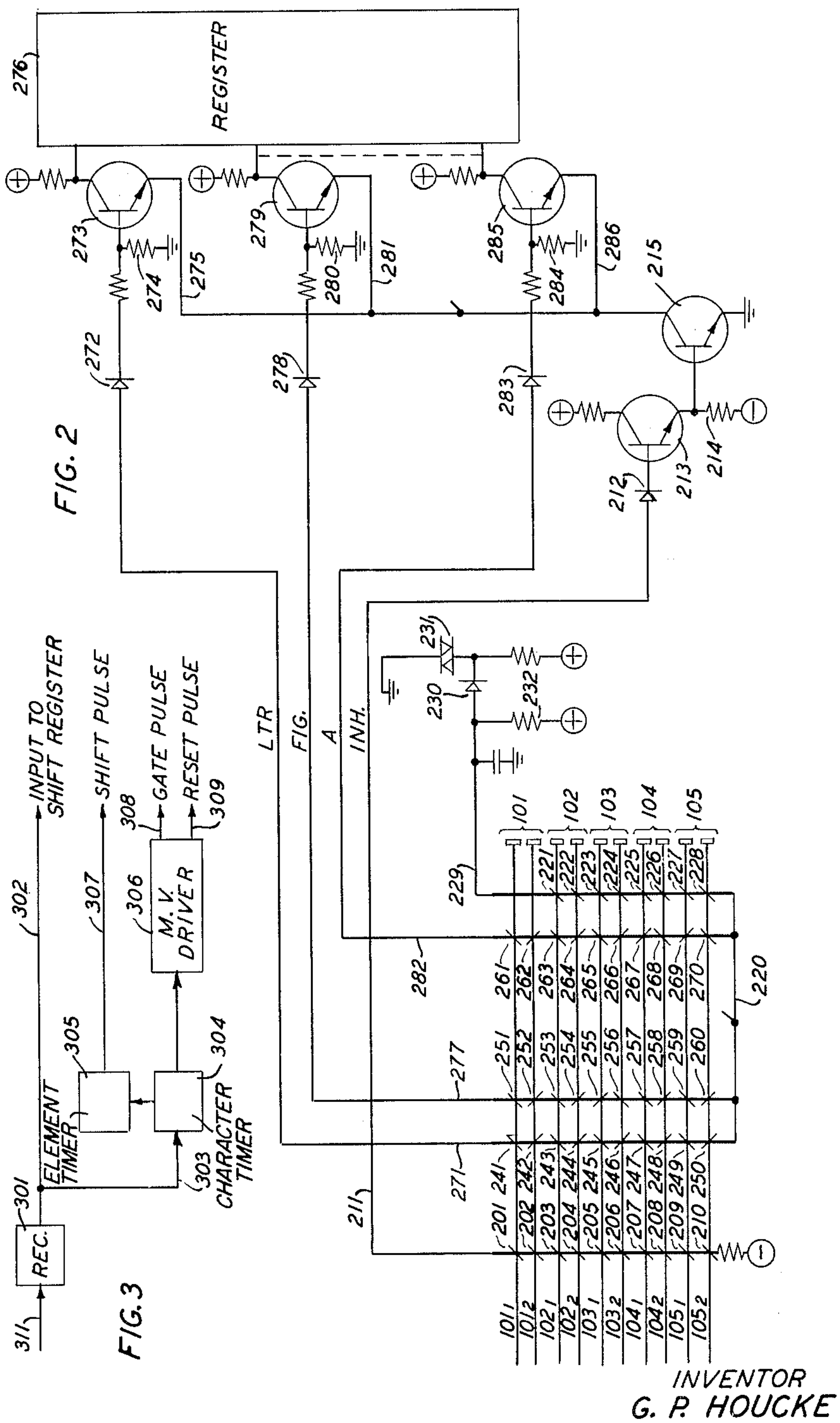

The means for fulfilling the foregoing objects and the practical embodiment of the features of this invention will be fully understood from the following description taken in conjunction with the accompanying drawing wherein:

FIGS. 1 and 2, when arranged as shown in FIG. 4, show the details of circuits and equipment which cooperate to form a translator in accordance with his invention; and FIG. 3 illustrates in block form a suitable receiving arrangement for controlling the translator circuit.

For the sake of clarity, the well known mirror symbol notation is employed in the drawing to represent the magnetic cores and their windings. This connection is described in detail in the article entitled "Pulse-Switching Circuits Using Magnetic Cores" by M. Karnaugh appearing in the Proceedings of the I.R.E., vol. 43, May 1955.

Referring now to FIGS. 1 and 2, the translating circuit, in accordance with a specific embodiment of this invention, comprises a plurality of magnetic cores displaying substantially rectangular hysteresis characteristics. The cores are divided into five pairs, equal in number to the elements in each binary code character and comprising the first core pair 101 consisting of cores 101$_1$ and 101$_2$, the second core pair 102 consisting of cores 102$_1$ and 102$_2$, the third core pair 103 consisting of cores 103$_1$ and 103$_2$, the fourth core pair 104 consisting of cores 104$_1$ and 104$_2$, and the fifth core pair 105 consisting of cores 105$_1$ and 105$_2$. All of the cores are depicted as horizontal lines in FIGS. 1 and 2.

As seen in FIG. 1, cores 101$_1$ and 101$_2$ have inductively coupled thereto input windings 115 and 116, respectively. One of the terminals of winding 115 is connected to one of the terminals of 116. The other terminal of 115 is connected to lead 113 and the other terminal of winding 116 is connected to positive battery by way of lead 119. Lead 113 is coupled by capacitor 108 to reset pulse lead 107 whereby, when a reset ground pulse is applied to lead 107, as described hereinafter, a positive current pulse is applied from lead 119 through windings 116 and 115, lead 113, and capacitor 108. This positive current pulse switches cores 101$_1$ and 101$_2$ to a remanent magnetization which may be described as to-the-right as viewed in FIG. 1, in accordance with the mirron symbol notation. This condition will hereinafter be termed the reset magnetic condition of the core.

The reset ground pulse on lead 107 is also applied to capacitor 112, whereby a positive current pulse is applied through lead 119 and winding 118 and winding 117 inductively coupled to cores 105$_2$ and 105$_1$, respectively, to lead 114, switching cores 105$_1$ and 105$_2$ to the reset condition in the came manner. Similarly, cores 102$_1$ and 102$_2$ include windings, not shown, serially interconnecting capacitor 109 and lead 119; cores 103$_1$ and 103$_2$ include windings serially interconnecting capacitor 110 with lead 119; and cores 104$_1$ and 104$_2$ include windings serially interconnecting capacitor 111 and lead 119. Accordingly, the reset ground pulse switches all the cores to the reset condition.

Binary code signals to be translated are applied serially to lead 151, as described thereinafter, and lead 151, in turn, extends to the input of shift register 150. Shift pulses applied to lead 152, as described hereinafter, shift the binary elements through the stages of shift register 150, whereby the five binary elements are eventually stored in stages 1 through 5 of shift register 150. When the first element constitutes a marking or binary "1" element, the first stage of shift register 150 is arranged to apply a ground to output lead 133 while positive battery is applied to lead 137 by way of resistor 138. Conversely, when a space or binary "0" element is stored in the first stage of shift register 150, ground is applied to lead 137 and positive battery is applied to lead 133 by way of resistor 134. Assuming that a space element is stored in the first stage of shift register 150, the positive battery on lead 133 is applied through resistor 132 to capacitor 130. As described hereinafter, a gate ground pulse is applied to lead 149 at this time, which ground pulse provides a negatively-going voltage potential through diode 131 to capacitor 130, since, as previously described, positive potential has been applied thereto through resistor 13. The resultant negative pulse is applied through capacitor 130 to lead 123, whereby a positive current pulse is applied through lead 119 and winding 127 on core $\mathbf{101_2}$. Thus, in accordance with the mirror symbol notation, the storage of a space element in the first stage of shift register 150 switches core $\mathbf{101_2}$ to a remanent magnetization which may be described as to-the-left as viewed in FIG. 1, whereby core $\mathbf{101_2}$ is switched to the set condition.

In the event that a marking signal is stored in the first stage, ground on lead 133 is applied to capacitor 130. The gate pulse applied to lead 149 and diode 131 does not lower the voltage potential on capacitor 130, whereby a positive current pulse is not applied through winding 127 and core $\mathbf{101_2}$ is not effected. With a mark element stored in the first shift register stage, however, the positive potential on lead 137 is applied to capacitor 140 by way of resistor 136. In this event, the gate ground pulse applied to lead 149 is extended through diode 135 whereby the potential on capacitor 140 is driven in a negative direction and a positive current pulse is applied from lead 119 to lead 122 by way of winding 126, which winding is inductively coupled to core $\mathbf{101_1}$. Accordingly, core $\mathbf{101_1}$ is switched to the set condition in response to the storage of a mark element in the first shift register stage. Conversely, with a space element in the first shift register stage, the ground on lead 137 applied through resistor 136 to capacitor 140 precludes the application of a negative-going voltage through diode 135, whereby core $\mathbf{101_1}$ is not effected by the gate pulse applied to lead 149.

In a similar manner, a mark element stored in the fifth stage of shift register 150 applies ground to output lead 143 and output lead 144 is rendered positive, applying, in turn, a positive potential to capacitor 141 through resistor 145. Thus the gate ground pulse applied through lead 149 and diode 146 provides a negative-going potential through capacitor 141 whereby a positive current pulse is applied through winding 128 to lead 124, setting core $\mathbf{105_1}$. Conversely, a spacing element in the fifth stage of shift register 150 renders lead 143 positive, which positive potential is applied through resistor 147 to capacitor 139. Accordingly, the gate pulse applied through lead 149 and diode 148 provides a negative-going potential through capacitor 139 and the resultant positive current pulse applied through winding 129 to lead 125 sets core $\mathbf{105_2}$. Accordingly, a mark element stored in the fifth stage of shift register 150 sets core $\mathbf{105_1}$ and a space element stored in the shift register stage sets core $\mathbf{105_2}$. Shift register stage 2 is similarly connected to a gating arrangement (not shown) whereby the gate pulse sets core $\mathbf{102_1}$ when a mark element is stored in the second shift register stage, and sets core $\mathbf{102_2}$ when a space element is stored in the second shift register stage. In the same manner, core $\mathbf{103_1}$ is set when a mark element is stored in the third shift register stage, core $\mathbf{103_2}$ is set when a space element is stored in the third shift register stage; core $\mathbf{104_1}$ is set when a mark element is stored in the fourth shift register stage and core $\mathbf{104_2}$ is set when a space element is stored in the fourth shift register stage. It can thus be seen that a pair of cores is associated with each of the shift register stages, one of the cores having an inductive winding thereon connected in a manner to set the core when a mark element is stored in the associated stage, and the other core having an inductive winding thereon connected in a corresponding manner to set the core if a space element is stored in the associated stage.

As seen in FIG. 2, cores $\mathbf{101_1}$ and $\mathbf{101_2}$ have inductively coupled thereto output windings 201 and 202, respectively. Similarly, the cores of core pairs 102 through 105 have inductively coupled thereto output windings 203 through 210 and all of the windings are connected in series between negative battery and inhibiting lead 211. Inhibiting lead 211, in turn, extends through diode 212 to the base of transistor 213. The emitter of transistor 213 is connected to the base of transistor 215, and with transistor 213 normally nonconductive, negative battery is applied through resistor 214 to maintain transistor 215 nonconductive.

As previously described, when a binary code character is stored in shift register 150 and a gate pulse is applied to lead 149, a selected core in each of core pairs 101 through 105 is set, switching the selected cores to the set condition and thereby inducing a positive voltage across the windings inductively coupled thereto. Since windings 201 through 210 are wound in a corresponding manner, as seen in FIG. 2, the five induced positive voltages produce a net positive resultant voltage which is applied via lead 211 and diode 212 to the base of transistor 213, turning the transistor ON. When transistor 213 turns ON, its emitter is driven in a positive direction, turning ON, in turn, transistor 215. This provides ground to the collector of transistor 215, which ground enables output circuits of the translator, as described hereinafter.

Core pairs 102 through 105 also include inductive windings 221 through 228, which windings are serially interconnected between reference lead 229 and lead 220. Lead 229, in turn, is connected to a voltage divider which includes resistor 232, diode 230, and reversely-poled parallel diodes 231, all of which are serially connected between positive battery and ground. Since, as well known in the art, a substantially constant voltage is maintained across diodes 231, the positive voltage applied through resistor 232 and diode 230 results in a positive incremental voltage at the junction of resistor 232 and diode 230. The constants of the voltage divider circuit are arranged so that the incremental positive voltage is less than the voltage induced across any one of the output windings on the translator cores for reasons stated hereinafter.

During the idle condition, the incremental positive voltage on lead 229 maintains the potential on lead 220 close to ground. The application of the gate pulse to lead 149, however, switches four of the cores in core pairs 102 through 105. Therefore, with respect to the fixed voltage on lead 229, a negative voltage is induced across each of the windings coupled to the switched cores in accordance with the mirror symbol notation, which negative voltages are additively applied to lead 220. Thus, upon the application of the gate pulse, lead 220 is driven negative to the extent corresponding to the voltages induced by four windings less the incremental voltage on lead 229.

Lead 220 is connected to "Letters" lead 271 by way of output windings 241 through 250, which are inductively coupled to the cores of core pairs 101 through 105; "Letters" lead 271 is connected, in turn, to the base of transistor 273 through diode 272. The emitter of transistor 273 is coupled to the collector of transistor 215 by way of lead 275. Since transistor 215 is normally not conducting, the emitter circuit of transistor 273 is open-circuited, and therefore not conducting. In addition, ground applied to the base of transistor 273 via resistor 274 maintains the transistor OFF. The collector of transistor 273 is connected to register 276 which may comprise any well known arrangement suitable for registering, storing, translating or repeating signals in accordance with the conductive conditions of leads such as the collector lead of transistor 273. For example, register 276 may include a diode matrix and a plurality of buffer amplifiers for selectively energizing a plurality of parallel leads in response to ground on an input lead such as the collector lead of transistor 273.

Winding 241 is connected to core 101, in a sense to induce a positive voltage, with respect to lead 220, when core $101_1$ is switched to the set condition. This tends to apply a positive voltage to lead 271 for application to the base of transistor 273 through diode 272. Since the application of positive voltage to the base of transistor 273 conditions the transistor for the conductive condition the setting of core $101_1$ functions to provide an aiding voltage for turning transistor 273 ON. Conversely, winding 242 is connected to core $101_2$ in the opposite sense to winding 241 whereby a negative voltage, with respect to lead 220, is induced when core $101_2$ is switched to the set condition. This tends to apply a negative voltage to lead 271 which opposes any aiding voltage applied thereto by other windings.

Windings 243, 245, 247 and 249 are connected to cores $102_1$, $103_1$, $104_1$ and $105_1$, respectively, in the same sense as winding 241. Accordingly, when any one of cores $102_1$ through $105_1$ is switched to the set condition, the associated winding induces a voltage which tends to apply an aiding voltage to lead 271. Conversely, windings 244, 246, 248 and 250 are connected to cores $102_2$, $103_2$, $104_2$ and $105_2$, respectively, in the opposite sense to winding 241, whereby, when the associated core is set, the winding tends to apply an opposing voltage to lead 271.

It is thus seen that each core pair is provided with a pair of windings inductively wound in an opposite sense to provide either an aiding voltage or an opposing voltage to lead 271.

"Figures" lead 277 is connected to lead 220 via windings 251 through 260. Diode 278 couples lead 277 to the base of transistor 279 which normally has ground applied thereto by way of resistor 280. The emitter of transistor 279 is connected to the collector of transistor 215 via lead 281 and the collector of transistor 279 extends to the input of register 276. It is noted that winding 251 is connected to core $101_1$ in the same manner as winding 241 whereby, when core $101_1$ is set, winding 251 tends to apply an aiding voltage to lead 277, and winding 252 is connected to core $101_2$ in the same manner as winding 242 to apply an opposing voltage to lead 277. Similarly, windings 253, 257 and 259 are connected in a manner to apply an aiding voltage to lead 277 and windings 254, 258 and 260 are arranged to apply an opposing voltage to lead 277. The arrangement of windings 255 and 256 differ from windings 245 and 246, however, since, as seen in FIG. 2, they are wound in a manner to apply an opposing voltage and an aiding voltage, respectively, to lead 277.

Lead 282 is connected to lead 220 via windings 261 to 270. Diode 283 couples lead 282 to the base of transistor 285 which normally has ground applied thereto through resistor 284. The emitter of transistor 285 is connected to the collector of transistor 215 via lead 286 and the collector of transistor 285 extends to the input of register 276.

It is noted that the arrangement of windings 261 to 270 are such that each core pair includes a winding having one sense to apply a positive or aiding voltage to lead 282 and a winding having an opposite sense to apply a negative or opposing voltage to lead 282. The particular arrangements of the core pair winding are in accordance with a selected code character, such as the teletypewriter character A.

Other leads, not shown, are similarly connected to lead 220 via windings on all the translator cores and the leads also extend to register 276 via transistor gates which are controlled by transistor 215. The windings on each core pair are wound in an opposite sense, each arrangement being in accordance with a selected code character.

Assuming now that a Letters signal is stored in the shift register when the gate pulse is applied, all of the shift register stages are storing mark elements. Accordingly, cores $101_1$ through $105_1$ are switched, whereby a positive voltage is induced across each of output windings 241, 243, 245, 247 and 249, as previously described. Therefore, an additive voltage corresponding to the induced voltages produced by the five windings is applied to lead 271. Since, as previously described, the application of the gate pulse also induces a negative voltage on lead 220 in response to the switching to the set condition of four of the cores, namely, cores $102_1$ through $105_1$, which negative voltage opposes the positive voltage induced by windings 241, 243, 245, 247 and 249 and the voltages induced across four windings, such as windings 243, 245 and 249 are completely cancelled out. Thus a net positive resultant signal is applied to lead 271 by the voltage induced by winding 241 plus the incremental voltage on reference lead 229. Accordingly, a positive voltage is applied through diode 272 to the base of transistor 273, turning the transistor ON since the collector of transistor 215 is at the ground potential upon the application of the gate pulse, as previously described. When transistor 273 turns ON, its collector is driven towards ground and this ground signal is applied to register 276 for providing the selective indication which, in this event, is the reception of a Letters signal.

Considering now the switching of cores $101_1$ through $105_1$ in response to the Letters signal, it is noted that winding 251 on the core $101_1$ winding 253 on core $102_1$, winding 257 on core $104_1$ and winding 259 on core $105_1$ apply an additive positive voltage to lead 277, as previously described. Since, it is recalled, windings 221, 223, 225 and 227 induce an opposing voltage to lead 220, this positive signal is effectively cancelled out. The remaining induced voltage provided by winding 255 is negative, as previously described. Accordingly, the net voltage applied to lead 277 corresponds to the negative voltage induced across winding 255 less the incremental positive voltage applied to lead 229. Since the induced voltage exceeds the applied reference voltage, the voltage on lead 277 is negative, which voltage is effectively blocked by diode 278.

Similarly, with respect to each of the other leads, upon the reception of the Letters character, a maximum of four aiding voltages are applied to the lead together with a minimum of one opposing voltage whereby the aiding voltages are cancelled out by the induced reference lead voltages and the associated transistor is maintained OFF. It is thus seen that transistor 273 is the only transistor rendered conductive in response to the reception of the Letters character.

Assuming now that a Figures signal is received, when the gate pulse is applied the third shift register stage is storing a space element and each of the other shift register stages is storing a mark element. Accordingly, cores $101_1$, $102_1$, $103_2$, $104_1$ and $105_1$ are switched whereby a positive voltage is induced across each of output windings 251, 253, 256, 257 and 259 providing an additive aiding voltage correspoding to the induced voltages produced by the five windings to lead 277. Since the opposing reference voltage cancels only the portion of the aiding voltage corresponding to the induced voltages produced by four windings, transistor 279 turns ON, as previously described, to indicate to register 276 the reception of a Figures signal. With respect to each of the other leads, upon the reception of the Figures character, a maximum of four aiding voltages are applied to the lead whereby the aiding voltages are cancelled out by the induced reference voltage and the associated transistor is maintained OFF. It is thus seen that a selected transistor is rendered conductive in response to the reception of a predetermined character individual thereto.

The receiving circuit for the binary code characters includes a receiver, generally indicated by block 301, FIG. 3, a character timer 304, an element timer 305 and a multivibrator-driver 306. In the disclosed embodiment of the invention, the binary code characters comprise start-stop teletypewriter characters comprising a start spacing element, five intelligence elements, and a stop marking element.

The binary code elements are serially received over a suitable transmission line such as line 311 and applied to receiver 301. Receiver 301 repeats the signals and applies them in serial fashion to line 302 in a manner well known in the art. Line 302, in turn, is connected to shift register input lead 151 which, as previously described, serially applies the signal elements to shift register 150.

Character timer 304, coupled to line 302 by way of lead 303, comprises a timing circuit such as a monostable multivibrator which initiates a cycle of operation when line 302 goes from the normal idle mark condition to the space condition at the beginning of each binary code character. In addition, each timing cycle of character timer 304 is arranged to provide in interval equal to the interval of time occupied by the start element and the five intelligence elements of the binary character.

Element timer 305 comprises a normally-disabled free-running pulse generator, such as an astable multivibrator. Element timer 305 is arranged to provide a train of pulses, when enabled, which pulses are separated in time by an interval equal to the duration of a binary code element. In the normal idle condition, character timer 304 applies a disabling signal to element timer 305. Upon the reception of the start signal of a binary code element, character timer 304 starts the character timer interval and during the duration thereof removes the disabling signal applied to element timer 305. This enables element timer 305 to generate a train of six pulses, the first pulse appearing during the start element interval and the five succeeding pulses appearing during the five intelligence elements. The element timer pulses are applied to lead 307 which is connected to shift pulse lead 152. Accordingly, the start element is shifted through shift register 150 and discarded and the five intelligence elements, at the termination of the character timer interval, are stored in the five shift register stages.

When character timer 304 restores at the termination of the character timer interval, an enabling pulse is applied to multivibrator-driver 306. Multivibrator-driver 306 comprises a monostable multivibrator which applies a ground pulse to lead 308 when it is enabled and a ground pulse to lead 309 when it self-restores. Lead 308 is connected to gate pulse lead 149 thus providing the gate pulse for gating the conditions of the shift register stages to the translator inputs, as previously described, when the five intelligence elements are stored. Lead 309 is connected to reset pulse lead 107 thus providing the reset pulse for switching the translator cores to the reset condition, as previously described, after the translation of the binary character is affected.

Although a specific embodiment of this invention has been shown and described, it will be understood that various modifications may be made without departing from the spirit of this invention and within the scope of the appended claims.

What is claimed is:

1. In a translator for a binary digit code the combination comprising a plurality of pairs of magnetic elements each of said elements capable of assuming either of two states, a first and second input lead individual to each of said binary digits and associated with a corresponding one of said pairs of elements, said input leads individually inductively coupled in a corresponding manner to a separate one of said elements, a plurality of output leads, each of said output leads serially inductively coupled in one sense to one of said elements and in an opposing sense to the other of said elements in all of said pairs of elements, and detecting means connected to said output lead.

2. In a translator for a binary digit code the combination comprising a plurality of pairs of magnetic elements each of said elements capable of assuming either of two states, a first and second input lead individual to each of said binary digits and associated with a corresponding one of said pairs of elements, said input leads individually inductively coupled in a corresponding manner to a separate one of said elements, a plurality of output leads, each of said output leads serially inductively coupled in opposite sense to each of said elements in all of said pairs of elements, a reference lead serially inductively coupled in the same sense to each of said elements in certain of said pairs of elements, and comparison means connected across said output lead and said reference lead.

3. In a translator for a binary code having *n* digits the combination comprising *n* pairs of magnetic elements each of said elements capable of assuming either of two states, a first and second input lead individual to each of said digits and associated with a corresponding one of said pairs of elements, said input leads individually inductively coupled in a corresponding manner to a separate one of said elements, a plurality of output leads, each of said output leads serially inductively coupled in opposite sense to each of said elements in all of said pairs of elements, a reference lead serially inductively coupled in the same sense to each of said elements in $n-1$ of said pairs of elements, and comparison means connected across said output lead and said reference lead.

4. In a translator for a binary digit code the combination comprising a plurality of pairs of magnetic elements, a pair of input leads individual to each of said binary digits and associated with a corresponding one of said pairs of elements, said input leads individually inductively coupled to a separate one of said elements, an output lead serially inductively coupled to all of said elements, means responsive to the energization of one input lead of each of said pairs of input leads for inducing a voltage having a first polarity in said output lead, means responsive ot the energization of the other input lead of each of said pairs of input leads for inducing a voltage having an opposite polarity in said output lead, and means for detecting the net resulting voltage induced in said output lead.

5. In a translator for a binary digit code the combination comprising a plurality of pairs of magnetic elements, a pair of input leads individual to each of said binary digits and associated with a corresponding one of said pairs of elements, said input leads individually inductively coupled to a separate one of said elements, a plurality of output leads, each of said output leads serially inductively coupled to all of said elements, a reference lead serially inductively coupled to certain of said elements, means responsive to the energization of one input lead of each of said pairs of input leads for inducing a voltage having a first polarity in said output lead and in said reference lead, means responsive to the energization of the other input lead of each of said pairs of input leads for inducing a voltage having said first polarity in said reference lead and a voltage having an opposing polarity in said output lead, and means for comparing the voltage induced in said output lead with the voltage induced in said reference lead.

6. In a translator for a binary code having *n* digits the combination comprising *n* pairs of magnetic elements, a pair of input leads individual to each of said digits and associated with a corresponding one of said pairs of elements, said input leads individually inductively coupled to a separate one of said elements, a plurality of output leads, each of said output leads serially inductively coupled to all of said elements, a reference lead serially inductively coupled to $n-1$ of said pairs of elements, means responsive to the energization of one input lead of each of said pairs of input leads for inducing a voltage having a first polarity in said output lead and in said reference lead, means responsive to the energization of the other input lead of each of said pairs of input leads for inducing a voltage having said first polarity in said reference lead and a voltage having an opposing polarity in said output lead, and means for comparing the voltage induced in said output lead with the voltage induced in said reference lead.

7. In a translator for binary code characters having $n$ digits the combination comprising $n$ pairs of magnetic elements each of said elements capable of assuming either of two states, a pair of input leads individual to each of said digits and associated with each of said pairs of elements, each of said pairs of input leads inductively coupled to a corresponding pair of said elements, an output lead corresponding to each character of said binary code, voltage responsive means connected to said output lead, means responsive to the energization of one input lead of each of said pairs of input leads for setting one of said elements of said associated pair of elements in one of said states, means responsive to the energization of the other input lead of each of said pairs of input leads for setting the other of said elements of said associated pair of elements in one of said states, means individual to each of said $n$ pairs of elements and responsive to said setting of said one element in said one state for inducing an aiding voltage in said output lead, and other means individual to each of said $n$ pairs of elements and responsive to said setting of said other element in said one state for inducing an opposing voltage in said output lead.

8. In a translator for binary code characters having $n$ digits the combination comprising $n$ pairs of magnetic elements each of said elements capable of assuming either of two states, a pair of input leads individual to each of said digits and associated with and inductively coupled to each of said pair of elements, an output lead corresponding to each character of said binary code, voltage responsive means connected to said output lead, means responsive to the energization of one input lead of each of said pairs of input leads for setting one of said elements of said associated pair of elements in one of said states, means responsive to the energization of the other of said pair of input leads of each of said pairs for setting the other of said elements of said associated pair of elements in one of said states, means individual to each of said $n$ pairs of elements and responsive to said setting of said one element in said one state for inducing an aiding voltage in said output lead, other means individual to each of said $n$ pairs of elements and responsive to said setting of said other element in said one state for inducing an opposing voltage in said output lead, and further means individual to each of $n-1$ of said pairs of elements and responsive to said setting of one of said elements in said one state for inducing an opposing voltage in said output lead.

9. An $n$ bit binary code to one-out-of-$2^n$ bit code translator comprising $n$ pairs of magnetic cores, each of said cores having a substantially rectangular hysteresis characteristic and capable of being switched between a first condition of magnetic remanence and a second condition of magnetic remanence, means inductively coupled to all of said cores for switching all of said cores to said first condition of magnetic remanence, means for selectively switching one or the other of said cores in each of said pairs of cores to said second condition of magnetic remanence in accordance with said $n$ bit binary code, $2^n$ output leads inductively coupled to all of said cores, each of said output leads inductively coupled to one core in each of said pairs of cores in one sense and to the other core of the same pair of cores in an opposing sense, all of said output leads being inductively coupled to the respective pairs of cores such that the selective switching of one core in each of said pairs of cores in accordance with a particular $n$ bit binary code will induce $n$ increments of voltage of one polarity on the particular one of said output leads which corresponds to said particular binary code and less than $n-1$ increments of voltage of said one polarity on all other of said output leads.

10. The combination defined in claim 9 wherein said means for selectively switching one or the other of said cores in each of said pairs of cores comprises $n$ pairs of input leads, each pair of which is individually associated with one of said pairs of cores, each of said input leads of each of said pairs of input leads being individually inductively coupled to one of said cores in the pair of cores associated therewith, and means for selectively energizing one of said input leads of each of said pairs of input leads in accordance with said $n$ bit binary code to selectively switch one core in each of said pairs of cores to said second condition of magnetic remanence.

11. The combination defined in claim 9 further comprising a source of reference voltage of a second polarity, means applying said second polarity reference voltage in parallel to all of said output leads, and means for detecting the net resulting voltage of said one polarity induced on said output leads in response to the selective switching of one core of each of said pairs of cores to said second condition of magnetic remanence.

12. The combination defined in claim 11 wherein said source of reference voltage of a second polarity and said means for applying said reference voltage in parallel to all of said output leads comprises a reference lead inductively coupled in the same sense to said cores in $n-1$ pairs of said cores, and means connecting said reference lead in parallel to all of said output leads.

13. The combination defined in claim 9 further comprising output means connected to said output leads, and means independent of said output leads and responsive to the selective switching of one core in each of said pairs of cores to said second condition of magnetic remanence for enabling said output means.

14. The combination defined in claim 13 wherein said means for enabling said output means comprises an inhibiting lead inductively coupled to all of said cores in said $n$ pairs of cores in the same sense, and gate means responsive to the voltage induced on said inhibiting lead when one core in each of said pairs of cores is selectively switched to said second condition of magnetic remanence for enabling said output means.

References Cited by the Examiner

UNITED STATES PATENTS

| | | | |
|---|---|---|---|
| 2,846,671 | 8/1958 | Yetter | 340—347 |
| 2,994,076 | 7/1961 | Havens | 340—347 |
| 3,013,251 | 12/1961 | Wright | 340—347 |
| 3,026,509 | 3/1962 | Buser | 340—174 |
| 3,060,420 | 10/1962 | Brink | 340—347 |

OTHER REFERENCES

Pages 183–201, 6/52, Rajchman, Static Magnetic Matrix Memory and Switching Circuits, RCA Review, vol. 13.

Pages 2–23, Murphy, Basics of Digital Computers, John F. Rider Publisher, Inc., vol. 2, No. 196–2.

MALCOLM A. MORRISON, *Primary Examiner.*